United States Patent [19]

Kaupp et al.

[11] 4,017,479
[45] Apr. 12, 1977

[54] CATIONIC INDAZOLE-AZO-5-AMINO PYRAZOLE DYESTUFFS

[75] Inventors: Günther Kaupp, Binningen; Jacques Voltz, Riehen, both of Switzerland

[73] Assignee: Ciba-Geigy AG, Switzerland

[22] Filed: Mar. 14, 1973

[21] Appl. No.: 341,098

Related U.S. Application Data

[63] Continuation of Ser. No. 78,287, Oct. 5, 1970, abandoned, which is a continuation-in-part of Ser. No. 747,385, July 26, 1968, abandoned.

[30] Foreign Application Priority Data

Aug. 11, 1967 Switzerland ............ 11355/67

[52] U.S. Cl. .................... 260/158; 8/26; 260/162; 260/163; 260/310 R; 260/310 C
[51] Int. Cl.² .............. C09B 29/38; C09B 45/12; D06P 3/70
[58] Field of Search ........... 260/147, 162, 163; 8/26

[56] References Cited
FOREIGN PATENTS OR APPLICATIONS 1,429,434  1/1966  France .................. 260/162
1,486,066  5/1967  France .................. 260/162

Primary Examiner—Floyd D. Higel
Attorney, Agent, or Firm—Wenderoth, Lind & Ponack

[57] ABSTRACT

The present invention relates to a dye salt of the formula

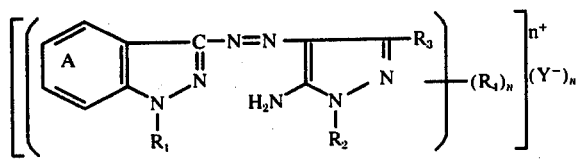

wherein $R_1$ represents lower alkyl or lower alkyl substituted by hydroxyl, cyano, carbamoyl or lower alkoxy-carbonyl, $R_2$ represents hydrogen, lower alkyl, hydroxy-lower alkyl, cyano-lower alkyl, benzyl, cyclohexyl, phenyl or phenyl substituted by lower alkyl, lower alkoxy, lower alkylsulfonyl, nitro, chlorine or bromine, $R_3$ represents methyl or methoxy, $R_4$ represents lower alkyl, cyano-lower alkyl, carbamoyl-lower alkyl or lower alkoxy-carbonyl-lower alkyl, and is bound to one of the two ring nitrogen atoms which are free from $R_1$ and $R_2$, $Y^-$ represents an anion and $n$ represents 1 or 2, and the benzene ring A is unsubstituted or substituted by chlorine, bromine, nitro, lower alkyl, lower alkoxy or lower alkylsulfonyl.

The new dyestuffs have yellow to golden yellow shades and exhibit excellent fastness to light, perspiration, washing and decatising.

13 Claims, No Drawings

CATIONIC INDAZOLE-AZO-5-AMINO PYRAZOLE DYESTUFFS

This is a continuation of application Ser. No. 78,287, filed on Oct. 5, 1970, now abandoned, which in turn is a continuation-in-part of Ser. No. 747,385, filed on July 26, 1968 and now abandoned.

DESCRIPTION OF THE INVENTION

The present invention concerns cationic azo dyestuffs of the indazole series, processes for the production of these cationic azo dyestuffs, their use for the dyeing or printing of acid-modified synthetic textile fibers, particularly of acid-modified polyacrylonitrile fibers and as industrial products acid-modified synthetic textile fibers dyed or printed with the aid of said cationic azo dyestuffs.

Most of the hitherto commercially used cationic azo dyestuffs have markedly high affinity for and a high drawing rate on acid-modified synthetic textile fibers. Therefore, in order to attain level dyeings on these textile materials with such cationic dyestuffs, particular care is necessary and the use of retarders has been generally recommended.

The present invention provides novel yellow to golden yellow cationic azo dyestuffs pertaining to the indazole series which possess unexpectedly, a slower drawing rate onto acidmodified synthetic textile fibers and which are of the formula

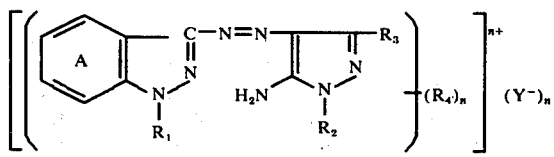

(I)

in which formula $R_1$ represents an optionally substituted lower alkyl group any substituent of which is a hydroxyl, cyano, carbamoyl or lower alkoxycarbonyl group.

$R_2$ represents hydrogen, a lower alkyl, hydroxy-lower alkyl, cyano-lower alkyl, benzyl or cyclohexyl group or an optionally substituted phenyl radical any substituent of which is a lower alkyl, lower alkoxy, nitro, lower alkyl-sulphonyl group or halogen, $R_3$ represents a methyl or methoxy group, $R_4$ represents a lower alkyl, cyano-lower alkyl, carbamoyl-lower alkyl or lower alkoxy-carbonyl-lower alkyl radical, and is bound to one of the ring nitrogen atoms free from substituents $R_1$ and $R_2$, $Y^-$ represents the anion of an acid, $n$ represents 1 or 2, and the benzene ring A is optionally substituted by halogen, nitro, lower alkyl, lower alkoxy or lower alkylsulphonyl groups.

Owing to their slower drawing rate on the aforesaid acid-modified synthetic fibers, the dyestuffs of Formula I can be used in dyeing these fibers with much less or no retarder at all.

In addition, the novel dyestuffs possess great color strength, good fastness properties, in particular good fastness to decatising and light, and good pH stability combined with even affinity to the fiber.

These novel dyestuffs are obtained by coupling diazotized 3-amino indazoles as defined above with 5-amino-pyrazoles substituted in 1- and 3-position, as defined above. To the best of our knowledge, such coupling between the aforesaid diazo and coupling components has never been carried out in the past.

Alkyl groups substituted by hydroxyl, cyano or carbamoyl groups occurrings as an aforesaid substituent $R_1$, $R_2$ or $R_4$ are particularly the β-hydroxyethyl, β-cyanoethyl and β-carbamoylethyl group.

When $R_2$ and A represent a substituted benzene ring, then they contain e.g. halogen atoms such as fluorine, chloride or bromine; lower allkyl groups such as the methyl, ethyl or t-butyl group; lower alkoxy groups such as the methoxy or ethoxy group, lower alkylsulphonyl groups such as the methylsulphonyl or ethylsulphonyl group; or, especially as substituent of ring A, a nitro group.

"Lower" as used in this specification and the appended claims, in connection with an aliphatic radical means that such radical has at most 4, and in the case of carbonyl groups being present therein, at most 5 carbon atoms.

As anion of an inorganic acid, $Y^-$ represents e.g. the chloride, bromide, iodide, phosphate or sulphate ion or the anion of a metal halide-hydrohalic acid, e.g. the trichlorozincate anion. As anion of an organic acid, $Y^-$ represents e.g. an alkylsulphate ion, an arylsulphonate ion such as the benzene-sulphonate or p-toluene-sulphonate ion, or the acetate or oxalate ion. Preferably, $Y^-$ represents the chloride, methyl-sulphate, ethyl-sulphate or trichloro-zincate anion.

Particularly valuable indazole-azo-pyrazole dye salts, which are distinguished by very easy accessibility, very high affinity to acid-modified synthetic fibers, great color strength and good fastness properties of their dyeings on these fibers are dye salts of Formula I, wherein each of $R_1$ and $R_4$ independently of the other, represents a lower alkyl group, preferably the methyl or ethyl group, $R_2$ represents a phenyl group or a lower alkyl group, $R_3$ represents the methyl group and the benzene ring A of the indazole moiety is substituted by halogen such as chlorine and/or nitro, or, optimally, unsubstituted.

Cationic dyestuffs falling under Formula I, in which $R_2$ has the meaning given above with the exception of hydrogen, are produced, e.g. by reacting an indazole-azo-pyrazole compound of the formula

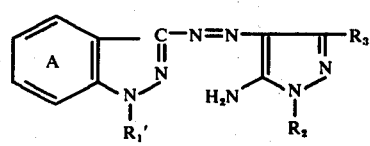

(II)

wherein

A, $R_2$ and $R_3$ have the same meanings as in Formula I, and $R_1'$ represents hydrogen or has the meaning given for $R_1$ in Formula I, with a reactive ester obtained from an aliphatic alcohol and an inorganic or organic acid, which ester is of the formula $$Y'-R_4 \qquad (III)$$

wherein
R$_4$ has the same meaning as in Formula I, and
Y' represents an equivalent of the acid radical affording the anion Y$^-$,
to form a cationic azo dyestuff of the formula

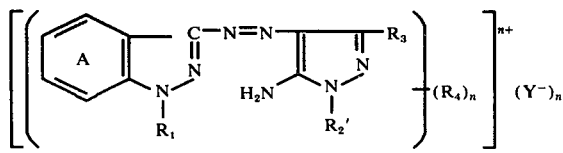

(Ia)

wherein A, R$_1$, R$_3$, R$_4$, Y$^-$ and n have the same meaning as in Formula I and
R$_2$' represents the same substituents as R$_2$ in Formula I with the exception of hydrogen.

The starting materials of Formula II are produced by coupling the diazonium compound of a 3-amino-indazole with a 5-amino-pyrazole compound capable of coupling in the 4-position, the coupling is performed advantageously in aqueous-acid medium, preferably at a pH of 2 to 6 and at low temperatures.

Suitable diazo compounds are, for example: 3-amino-indazole, 3-amino-5- or -6-nitro-indazole, 3-amino-5-methyl-indazole, 3-amino-5-methoxy-indazole, 3-amino-5-methylsulphonyl-indazole, 3-amino-6-chloro-indazole and 1-methyl-, 1-isopropyl-, 1-β-cyanoethyl- and 1-β-hydroxyethyl-3-amino-5-nitro-indazole.

Examples of particularly suitable coupling components are: 1-phenyl-3-methyl- and 1-phenyl-3-methoxy-5-aminopyrazole, 1-methyl-, 1-isopropyl- and 1-butyl-3-methyl-5-aminopyrazole, 1-β-cyanoethyl- and 1-β-hydroxyethyl-3-methyl-5-aminopyrazole, 1-cyclohexyl-, 1-p-tolyl- and 1-p-methoxyphenyl-3-methyl-5-aminopyrazole, 1-o-, 1-m- and 1-p-chlorophenyl-3-methyl-5-aminopyrazole, 1-o-, 1-m- and 1-p-bromophenyl-3-methyl-5-aminopyrazole, 1-benzyl-3-methyl-5-aminopyrazole and 3-methyl-5-aminopyrazole.

Examples of esters of Formula III with which the azo dyestuffs of Formula II are reacted to form dye salts of Formula Ia are the methyl, ethyl, n-propyl, n-butyl, β-cyanoethyl and β-carbamoylethyl esters of hydrochloric acid, hydrobromic acid and hydroiodic acid; dimethyl sulphate and diethyl sulphate; the methyl, ethyl and butyl esters of benzene sulphonic acid and of p-toluene sulphonic acid; and the alkyl esters, having an alkyl radical of preferably 1 to 4 carbon atoms, of bromoacetic acid. Instead of certain substituted alkanol esters, such as β-cyanoethyl or β-carbamoylethyl chloride or bromide, there can be used acrylonitrile or acrylamide in the presence of concentrated hydrochloric or hydrobromic acid. However, dimethyl and diethyl sulphate are preferred as quaternising agents.

The reaction of an azo dyestuff of Formula II with an ester of Formula III to form the cationic azo dyestuff of Formula Ia can be performed by heating a mixture of the two reactants either in an organic solvent not taking part in the ensuing reaction or in a mixture of water and a water-miscible organic solvent, preferably soluble in water in all proportions to which mixture there must be added an acid-binding agent. Suitable inert organic solvents are, e.g., optionally halogenated or nitrated aromatic hydrocarbons such as toluene, xylenes, halogenated benzenes and nitrobenzenes; optionally halogenated aliphatic hdyrocarbons, e.g. chloroform, trichloroethylene, tetrachloroethylene, tetrachloroethane and trichloroethane. Water-miscible organic solvents suitable especially in aqueous reaction media, are ketones such as acetone, methylethyl or methylisobutyl ketone, dioxane, dimethylsulfoxide, tetrahydrofuran, methylpyrrolidone and dimethylformamide.

The use of acid binding agents such as sodium or potassium hydroxide, sodium or potassium methylate, sodium or potassium acetate, calcium, sodium or potassium carbonate or magnesium oxide is recommended. The reactive esters serving as quaternising agents are preferably used in sufficiently large amounts so that not only one quaternisable ring nitrogen atom is quaternized but also that any -NH-group present as ring member in the dyestuff of Formula II used as starting material is also alkylated.

Upon using a still larger excess of the quaternising agent, e.g. n equivalents per equivalent of dyestuff of Formula II dye salts are obtained which contain two quaternized ring-nitrogen atoms in the cation moiety.

When the process of the invention is carried out in an inert organic solvent as reaction medium, the products resulting from the reaction with the esters of Formula III are mixtures of two cationic indazole-azo-pyrazole compounds. These two compounds, one of which contains one and the other two quaternized nitrogen atoms in the otherwise identical cation moiety, are of sufficiently different solubility in water so that the former can be precipitated for example by the addition of sodium chloride while the latter remains in solution. If desired, these compounds can also be separated by chromatographic adsoprtion e.g. on aluminium oxide or in silica gel. However, such separation is of no technical interest, since the individual compounds show no significantly better dyeing properties than are possessed by their mixtures.

When the process according to the invention is carried out in an aqueous organic solvent medium and with acid binding agent, then the resulting products consist essentially of a dye salt of the formula

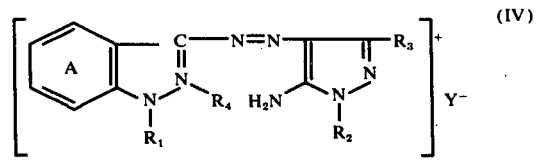

(IV)

wherein A, R$_1$, R$_2$, R$_3$, R$_4$ and Y$^-$ have the meaning given in Formula I,
i.e. a dye salt containing only one quaternized ring nitrogen atom.

The new cationic dyestuffs of Formula I are obtained as salts of the acids desired from the alkanol esters used as described hereinbefore in their production, i.e. as dye salts of inorganic or organic salts. These are, for instance, chlorides, bromides, iodides and especially methosulphates, ethosulphates, benzene sulphonates and p-toluene sulphonates. If desired, salts of other acids can also be produced by double reaction in a suitable polar solvent; e.g. oxalates can be produced by the addition of oxalic acid. Double salts can also be produced, e.g., with the dyestuff halides and corresponding zinc or cadminum halides.

The precpitation of the dye salts formed is completed advantageously by the addition of sodium chloride and/or zinc chloride in aqueous-acid solution to the reaction mixture and the dye salts are isolated by filtration.

A second process according to the invention which serves for the production of cationic azo dyestuffs of Formula I, wherein each of $R_1$ and $R_4$, independently of the other, represents a lower alkyl group and wherein $n$ represents 1 comprises reacting, in the presence of an oxidizing agent, an indazolone hydrazone of the formula

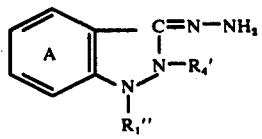

wherein each of
$R_1''$ and $R_4'$ independently of the other, represents a lower alkyl group and
A has the same meaning as in Formula I,
with a 5-aminopyrazole of the formula

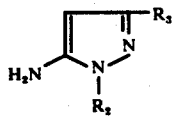

wherein
$R_2$ and $R_3$ have the same meanings as in Formula I,
to form a corresponding cationic azo dyestuff according to the invention.

The inazolone hydrazones of Formula V, which can be used as starting materials, are produced by known methods, e.g. from 3-halogen-indazolium salts by reaction with hydrazine in the manner described in British Pat. No. 1,006,315.

The hydrazones of Formula V which can be used in this second process can be used as free bases or in the form of their salts, e.g. their hydrochlorides. 1,2-Dimethyl-5- and 6-nitro-indazolone-3-hydrazone hydrochloride, for example, are easily accessible hydrazones of Formula V.

In general, the oxidative coupling of this second process is performed at room temperature or at slightly raised temperature in aqueous-acid medium. Certain water-miscible organic solvents, such as acetic acid or dioxane, can be used in the reaction medium.

Depending on the hydrazone, oxidizing agents having a weak, medium or strong oxidizing potential are used, for instance, hydrogen peroxide, organic peracids such as peracetic acid, persalts such as perborates or persulphates, permanganates, chromates or bichromates, hypochlorites or hypobromites, chlorites, ferricyanides, and peroxides such as manganese, lead dioxide or lead tetraacetate.

The dye salts according to the invention formed by the above-described second process are precipitated advantageously by the addition of sodium chloride and/or zinc chloride to the aqueous reaction mixture and the precipitates are isolated by filtration.

Depending on the type of their anion, particularly when the dyestuffs are in the form of salts of a strong inorganic acid or organic sulphonic acid, the cationic dyestuffs of Formula I formed are of very good to medium solubility in water. They can be converted into lacquer or pigment dyestuffs by reaction with certain acids such as hetero polyacids, or acid dyestuffs. They are also suitable for the dyeing or printing of mordanted cotton and leather.

However, they are particularly suitable for the dyeing of acid-modified synthetic textile fibers such as acid-modified polyamide, polyurethane, polypropylene and polyester, and particularly, for the dyeing or printing of acid-modified polyacrylonitrile fibers.

Acid-modified synthetic polyacrylonitrile fibers are, for instance ORLON 42 and ACRILAN; acid-modified polyester fibers are, e.g. DACRON 64 and acid-modified polyamide fibers are known in the textile industry, e.g. by the names of POLYAMIDE 844, 830 and PERLON N. In this specification R identicates a register Trade Mark. The textile material can be dyed in any form desired, for example in the form of flakes, slubbing, threads, yarn, knitted ware or fabrics. It can also be a blend of acid-modified and non-acid-modified fibers in which case the non-acid-modified textile fibers such as synthetic polyamide fibers of especially wool and cotton are well reserved.

The new cationic azo dyestuffs of Formula I are stable in a wide pH range. From aqueous, neutral or, preferably, from weakly acid solution, optionally in the presence of wetting agents have a dispersing action, such as condensation products of alkylene oxide and higher alcohols, the novel dye salts draw with substantial or complete bath exhaustion onto acid-modified polyacrylonitrile fibers on heating in an open vessel or in a closed dyebath under pressure. Without the addition of retarders, they produce level, full, yellow to golden yellow dyeings on this material and also on acid-modified polyamide fibers such as Perlon N which dyeings have excellent fastness to light, perspiration, washing, milling and decatising.

The following non-limitative Examples illustrate the invention. The temperatures are given therein in degrees Centigrade.

EXAMPLE 1 a. 31.7 g of the dyestuff of the formula

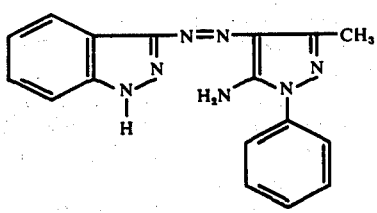

and 5.2 g of magnesium oxide are slurried in 150 g of chlorobenzene and the slurry is heated for 10 minutes at 110° while stirring. A solution of 30g of dimethyl sulphate in 30 g of chlorobenzene is then added dropwise at 110°–115° within 10 minutes and the whole is stirred at 110°–115° until complete methylation occurs whereby the basic dyestuff formed partly precipitates. The reaction mixture is then cooled to room temperature, 100 g of chlorobenzene are added and the precipitate formed is filtered off. It is washed with chlorobenzene and dried.

The resulting product is a composite dye consisting of a mixture of the dye salts of the formulae:

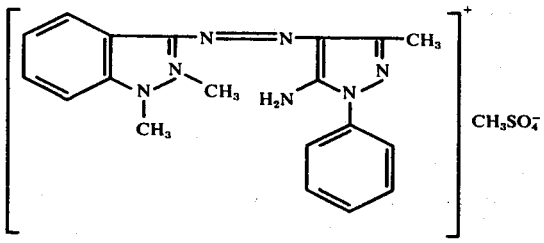

and

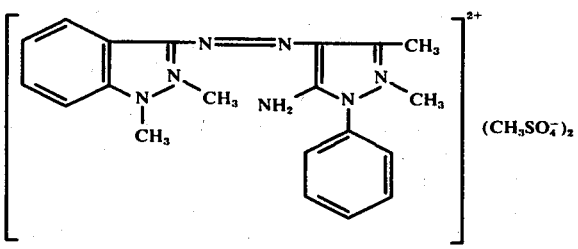

It dissolves in water with a yellow color. From an acetic acid bath, it dyes acid-modified polyacrylonitrile fibers and acid-modified synthetic polyamide fibers in vivid yellow shades. The dyeings have excellent fastness to light, perspiration and decatising and are distinguished by great stability to alkali and acid.

b. The mixture of cationic azo compounds obtained in this and subsequent examples can be separated by chromatographic adsorption, e.g. on silica gel. This separation, however, is not necessary for technical purposes and not economical as the properties of the two cationic compounds are not better than those of the mixture.

c. The monoazo dyestuff used in this example as starting material is obtained, e.g. by diazotising 3-amino-indiazole in the known way and then coupling with 1-phenyl-3-methyl-5-amino-pyrazole. d. 10 g of the composite dye salt consisting of the mixture of compounds of Formulas VIIIa and VIIIb are dissolved in a mixture of 100 ml of water and 2 ml of 80%-acetic acid. 1 ml of concentrated hydrochloric acid and 15 g of sodium chloride are added to the solution. The compound of Formula VIIIa precipitates in the form of the corresponding chloride and is separated by filtration, washed with aqueous sodium chloride solution, and dried.

e. by using in procedure (d) 25 g sodium chloride and 10 g of potassium chloride in lieu of 15 g of sodium chloride, then the composite dye of Formulas VIIIa and VIIIb precipitates in the form of its chloride salt.

f. By repeating procedure (d) of the above example, but adding to the aqueous solution acidified with hydrochloric acid 2 g of zinc chloride together with 15 g sodium chloride, the composite dye salt of compounds VIIIa and VIIIb is obtained in the form of the zinc chloride salts.

EXAMPLE 2

6.6 g of the dyestuff of the formula

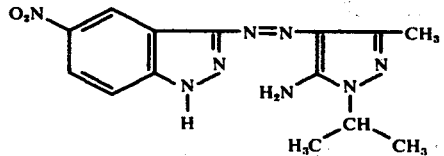

and 1.2 g of magnesium oxide on 140 g of tetrachloroethane are stirred well for 10 minutes 115°. A solution of 10 g of dimethyl sulphate in 30 g of tetrachloroethane is added dropwise to the solution obtained, the addition being made within 5 minutes at 115° . The mixture is stirred for 45 minutes at 115°–120° . It is then cooled to 90° , 100 ml of hot water and 0.5 g of decolouring charcoal are added, the tetrachloroethane is removed by steam distillation, the sulphuric acid solution of the dyestuff which remains is adjusted to a pH of 3 to 4 by the addition of sodium acetate, and, finally, it is filtered. The filtrate is acidified with hydrochloric acid; 2 g of zinc chloride and 15% of sodium chloride, calculated on the total volume of the liquid, is added, the mixture is cooled to room temperature and the yellow precipitate formed is filtered off. This is washed with about 15% aqueous sodium chloride solution and dried.

The resulting product is a composite dye consisting of a mixture of the dye salts of the formulae:

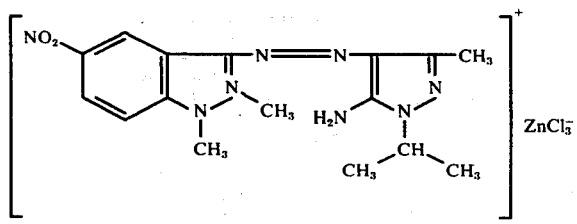
(Xa)

and

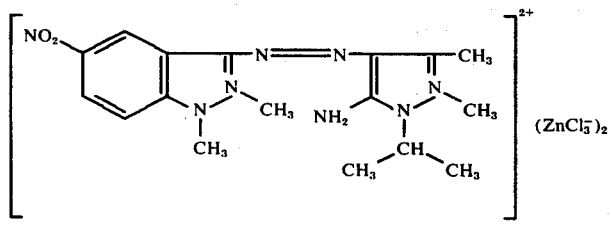
(Xb)

It dissolves in water with a golden yellow color and dyes acid-modified polyacrylonitrile fibers and acid-modified polyamide and polyester fibers in vivid golden yellow shades from an acetic acid bath. The dyeings have excellent fastness to light, perspiration and decatising.

The monoazo dyestuff used in this example as starting material is obtained, e.g. by diazotising 3-amino-5-nitro-indazole in the known way and then coupling with 1-isopropyl-3-methyl-5-aminopyrazole.

EXAMPLE 3

14.5 g of the dyestuff of the formula

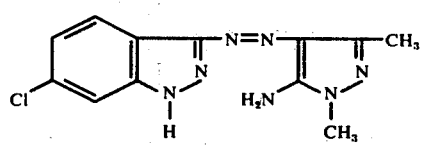
(XI)

and 4 g of magnesium oxide are slurried in 40 g of diethyl sulphate and the slurry is heated for 10 minutes at 100°. On completion of the exothermic reaction, the reaction mixture is poured into 550 ml of water and the mixture is stirred until a clear yellow solution is formed. 1.5 g of zinc chloride and 90 g of sodium chloride are added thereto, and the precipitated yellow precipitate is filtered off and dried.

The resulting product is a composite dye consisting of a mixture of the dye salts of the formulae.

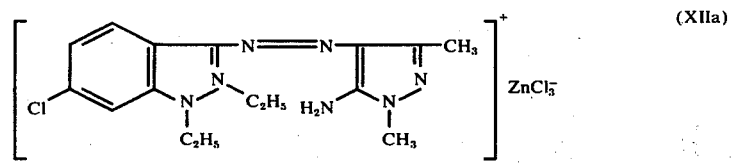
(XIIa)

and

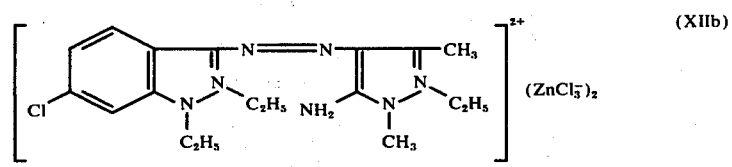
(XIIb)

It dissolves in water with a yellow color.

From an acetic acid bath it dyes acid-modified polyacrylonitrile, polyamide and polyester fibers in vivid yellow shades. The dyeings have excellent fastness to light, perspiration and decatising.

The manoazo dyestuff used in this examples as starting material is obtained, e.g. by diazotising 3-amino-6-chloro-indazole in the known way and then coupling with 1,3-dimethyl-5-aminopyrazole.

By repeating Example 1, but using instead of the monoazo dyestuff of Formula VII, dyestuffs which are formed by coupling the diazo and coupling components given in columns II and III of the following Table I, and alkylating these azo dyestuffs with the alkylating agents given in column IV, then the corresponding cationic composite dyes are obtained which produce dyeings having similarly good properties on acid-modified polyacrylonitrile, polyester and polyamide fibers. The shade of the dyeings obtained with the corresponding dye salts on acid-modified polyacrylonitrile fibers is given in column V of the table.

The chloride salts and zinc chloride salts of each of the composite dyes resulting from Examples 4 to 25a inclusive of Table I and of the dye salts of Examples 37 and 38, infra, are obtained by repeating the procedures of Examples 1(e) and 1(f), respectively.

TABLE 1

| I No. | II diazo component | III coupling component | IV alkylating agent | V shade on acid modified polyacrylonitrile fibres |
|---|---|---|---|---|
| 4. | 3-amino-6-chlorindazole | 1-phenyl-3-methyl-5-aminopyrazole | dimethyl sulphate | yellow |
| 5. | 3-amino-5-nitroindazole | 1,3-dimethyl-5-aminopyrazole | " | golden yellow |
| 6. | 3-aminoindazole | " | diethyl sulphate | yellow |
| 7. | " | 1-β-cyanoethyl-3-methyl-5-aminopyrazole | ω-bromo-propionitrile | " |
| 8. | " | 1-β-hydroxyethyl-3-methyl-5-aminopyrazole | bromoacetamide | " |
| 9. | " | 1-cyclohexyl-3-methyl-5-aminopyrazole | p-toluene-sulphonic acid methyl ester | " |
| 10. | " | 1-(p-tolyl)-3-methyl-5-aminopyrazole | dimethyl sulphate | " |
| 11. | " | 1-(p-methoxyphenyl)-3-methyl-5-aminopyrazole | bromoacetic acid methyl ester | " |
| 12. | " | 1-(o-chlorophenyl)-3-methyl-5-aminopyrazole | dimethyl sulphate | " |
| 13. | " | 1-(p-chlorophenyl)-3-methyl-5-aminopyrazole | " | " |
| 14. | " | 1-benzyl-3-methyl-5-aminopyrazole | " | " |
| 15. | 3-amino-5-methoxyindazole | 1-phenyl-3-methyl-5-aminopyrazole | " | " |
| 16. | 3-amino-5-methylindazole | " | " | " |
| 17. | 3-amino-5-nitroindazole | 1-phenyl-3-methoxy-5-aminopyrazole | " | golden yellow |
| 18. | 3-aminoindazole | 1-(m-chlorophenyl)-3-methyl-5-aminopyrazole | " | yellow |
| 19. | 3-amino-5-nitroindazole | 1-phenyl-3-methyl-5-aminopyrazole | " | golden yellow |
| 20. | 3-amino-6-bromoindazole | 1-phenyl-3-methyl-5-aminopyrazole | dimethyl sulphate | yellow |
| 21. | 1-β-hydroxyethyl-3-amino-5-nitroindazole | 1-butyl-3-methyl-5-aminopyrazole | " | golden yellow |
| 22. | 3-aminoindazole | 1-(4'-nitrophenyl)-3-methyl-5-aminopyrazole | " | " |
| 23. | " | 1-(4'-methylsulphonylphenyl)-3-methyl-5-aminopyrazole | " | " |
| 24. | 3-amino-5-chloroindazole | 1-phenyl-3-methyl-5-amino-pyrazole | " | yellow |
| 25. | 3-aminoindazole | 3-methyl-5-amino-pyrazole | " | " |
| 25a | " | 1-isopropyl-3-methyl-5-amino-pyrazole | " | " |

EXAMPLE 26

26.0 g of 1,2-dimethyl-5-nitro-indazolone-3-hydrazone hydrochloride are dissolved in 500 ml of water. A solution of 14 g of 1-isopropyl-3-methyl-5-aminopyrazole in 50 g of acetic acid is added and, while stirring, a solution of 10 g of sodium chlorite in 100 ml of water is added dropwise to the reaction mixture within 30 minutes. The mixture becomes yellow color in a short time. To complete the reaction, the reaction mixture is heated for another 4 hours at 45°–50° and then the dyestuff formed is precipitated by the addition of 70 g of sodium chloride and 2 g of zinc chloride. It is filtered off, the filter residue is washed with 15% aqueous sodium chloride solution and dried. The dye salt so obtained of which the formula is

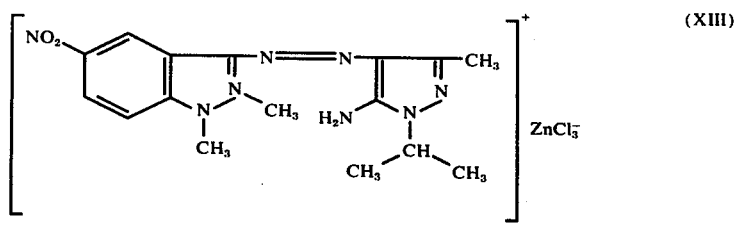

(XIII)

dissolves in water with a golden yellow color.

Dyestuffs of similar properties are obtained by repeating the procedure set forth in Example 26 but using as starting hydrazones the hydrochlorides of the hydrazones given in the second column of the following Table II, as pyrazole coupling components those given in the third column, and, as oxidising agents, those given in the fourth column; these dyestuffs dye acid-modified polyacrylonitrile fibers in the shades given in the last column of said table.

TABLE II

| Example No. | indazolone-hydrazone | 5-aminopyrazole coupling component | oxidizing agent | shade on acid modified polyacrylonitrile fibres |
|---|---|---|---|---|
| 27. | 1,2-dimethyl-5-nitro-indazolone-3-hydrazone | 1-isopropyl-3-methyl-5-aminopyrazole | sodium chlorite | golden yellow |
| 28. | '' | 1-phenyl-3-methyl-5-aminopyrazole | '' | '' |
| 29. | 1,2-dimethyl-5-nitro-indazolone-3-hydrazone | '' | '' | '' |
| 30. | 1,2-diethyl-6-nitro-indazolone-3-hydrazone | 1-isopropyl-3-methyl-5-aminopyrazole | '' | '' |
| 31. | 1-ethyl-2-methyl-6-nitro-indazolone-3-hydrazone | 1,3-dimethyl-5-amino-pyrazole | '' | '' |
| 32. | 1,2-dimethyl-6-chloro-indazolone-3-hydrazone | 1-β-cyanoethyl-3-methyl-5-aminopyrazole | lead tetracetate | yellow |
| 33. | 1,2-diethyl-5-chloro-indazolone-3-hydrazone | 1-β-hydroxyethyl-3-methyl-5-aminopyrazole | '' | '' |
| 34. | 1,2-dimethyl-5-methylsulphonyl-indazolone-3-hydrazone | 1-phenyl-3-methyl-5-amino-pyrazole | '' | '' |
| 35. | 1,2-dimethyl-5-nitro-indazolone-3-hydrazone | 3-methyl-5-amino-pyrazole | sodium chlorite | golden yellow |

EXAMPLE 36

31.7 g of the dyestuff of the formula

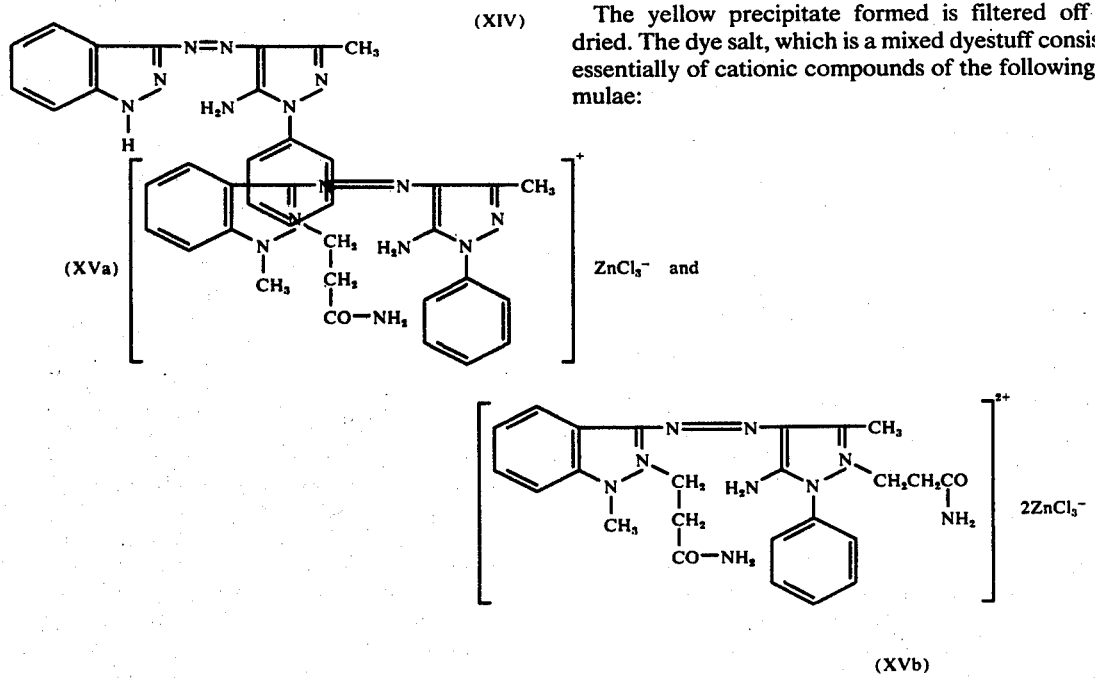

(XIV)

(XVa)

(XVb)

and 2.0 g of magnesium oxide in 300 g of anhydrous benzene are heated for 15 minutes at 75°–80°. A solution of 13 g of dimethyl sulphate in 25 g of benzene is then added and the mixture is stirred under reflux for 30 minutes. The benzene is then removed by distillation. 350 g of glacial acetic acid, 71 g of acrylic acid amide and 100 ml of 35% hydrochloric acid are added to the residue which remains and the mixture is heated for 3 hours at 90°–95°. On completion of the reaction, the greater part of the acetic acid is removed by distillation in vacuo. The residue is dissolved in 1000 ml of water and, if desired, filtered to remove undissolved parts. 1.5 g of zinc chloride and 150 g of sodium chloride are added to the filtrate while stirring.

The yellow precipitate formed is filtered off and dried. The dye salt, which is a mixed dyestuff consisting essentially of cationic compounds of the following formulae:

dissolves in water with a yellow color. From an acetic acid bath it dyes acid-modified polyacrylonitrile, polyamide and polyester fibers in vivid yellow shades. The dyeings have excellent fastness to light, perspiration and decatising. The mixture of cationic compounds obtained can be separated by chromatographic adsorption, e.g. on silica gel. This separation, however, is not necessary for technical purposes as the properties of the mono- and diquaternized compounds are not essentially different.

If, instead of the 71 g of acrylic acid amide and 10 ml of 35% hydrochloric acid, corresponding amounts of β-bromopropionic acid amide are used and the reaction is preformed in boiling chlorobenzene instead of in benzene and otherwise the procedure given in this example is followed, then a mixture of corresponding cationic compounds having similar valuable properties is obtained.

EXAMPLE 37

31.7 g of the monoazodyestuff of Formula VII (Example 1) are added with stirring to a mixture of 100 ml of water and 100 ml of dioxane to form a slurry. 8 g of aqueous 30% sodium hydroxide solution are added to the slurry and the resulting solution is heated to 60°.

Dimethylsulfate and aqueous 30% sodium hydroxide solution are added simultaneously and dropwise at such a rate that the pH of the reaction mixture remains between 7 and 9.5. The progress of methylation is checked by subjecting small test samples of the reaction mixture to thin-layer chromatography. Methylation is complet after about 90 minutes, whereupon addition of dimethylsulfate and sodium hydroxide solution is interrupted.

The dioxane is then removed from the reaction mixture by subjecting the latter to steam distillation and the resulting yellow solution is acidified with about 5 ml of concentrated hydrochloric acid.

The dyestuff is salted out by adding to the said mixture, per 100 ml thereof, 20 g of sodium chloride.

The resulting dyestuff consists of the compound of for formula $$\left[ \begin{array}{c} \text{(structure with indazole-N=N-pyrazole linkage, CH}_3\text{, CH}_3\text{, H}_2\text{N, CH}_2\text{, phenyl substituents)} \end{array} \right]^+ \text{Cl}^- \quad \text{(XVI)}$$

In a similar manner, dyestuffs of Formulae Xa, XIIa and the corresponding mon-quatermized compounds of Examples 4 through 25a are obtained with a degree of purity of 90% and higher.

EXAMPLE 38

31.7 g of the dyestuff of Formula VII and 5.2 g of magnesium oxide are slurried in 150 g of o-dichlorobenzene and the resulting slurry is heated at 140° while stirring. 50 g dimethyl sulphate are added to the stirred slurry within 5 minutes. The temperature is allowed to rise to about 150°–160° under reflux; the mixture is then held at this temperature with stirring for another 75 minutes, then cooled to 90° and the formed precipitate is separated hot by suction filtration. The residue is washed with a small amount of o-dichloro-benzene and dried in vacuo. It can be purified by recrystallization from ethanol.

The resulting dye salt has the Formula VIIIb. In an analogous manner the bis-quaternized compounds obtained in mixture with the mono-quaternized by the procedure of Examples 2 through 25a can be produced free from the corresponding mono-quaternized compounds.

EXAMPLE 39

0.5 g of the dye salt produced according to Example 1 are slurried with 0.5 ml of 80% acetic acid and dissolved in 400 ml of hot water. 1.0 ml of 80% acetic acid, 2 g of sodium acetate and 4 g of a condensation product of olein alcohol and 15 mols of ethylene oxide are added. The pH of this solution is about 4.5. 100 g of acid-modified polyacrylonitrile fabric are introduced at 50°, the temperature is raised to 100° within 15 minutes and dyeing is performed for 1 hour at the boil. The dyebath is practically exhausted at the end of this time. The dyed goods are treated for 15 minutes at 80° with the solution of 5 g of a fatty alcohol sulphonate and then rinsed and dried. The fabric, which has been dyed a vivid yellow shade, has excellent fastness to decatising and light.

EXAMPLE 40

0.5 g of the dye salt produced according to Example 2 are slurried with 0.5 ml of 80% acetic acid and dissolved in 4000 ml of hot water. 1.0 ml of 80% acetic acid, 2 g of sodium acetate and 4 g of a condensation product of olein alcohol and 15 mols of ethylene oxide are also added to the solution obtained. The pH of the solution is about 4.5. 100 g of acid-modified polyamide fabric are introduced at 50°, the temperature is raised to 100° within 15 minutes and dyeing is performed for 1 hour at the boil. At the end of this time, the dyebath is practically exhausted. The dyed goods are treated for 15 minutes at 80° with the solution of 5 g of a fatty alcohol sulphonate and then rinsed and dried. The fabric, which has been dyed yellow, has good fastness to light, perspiration and decatising.

If instead of the 100 g of acid-modified polyamide fabric, 200 g of a mixed fabric made from 50 parts of acid-modified polyamide and 50 parts of non-acid-modified polyamide are used and dyeing is performed as given in this example, then a strongly colored yellow dyeing is obtained on the acid-modified polyamide part whilst the non-acid-modified polyamide part remains practically undyed.

EXAMPLE 41

0.5 g of the dye salt produced according to Example 37 are slurried with 0.5 ml of 80% acetic acid and dissolved in 4000 ml of hot water. 1.0 ml of 80% acetic acid, 2 g of sodium acetate, 4 g of a condensation product of olein alcohol and 15 mols of ethylene oxide, and 20 g of a carrier, e.g. o-phenylphenol, are also added to the solution obtained. The pH of the solution is about 4.5. 100 g of acid-modified polyester fabric are introduced at 50°, the temperature is raised to 100° within 15 minutes and dyeing is performed for 1 hour at the boil. At the end of this time, the dyebath is practically exhausted. The dyed goods are treated for 15 minutes at 80° with the solution of 5 g of a fatty alcohol sulphonate and then rinsed and dried. The fabric which has been dyed in a vivid yellow shade has excellent fastness to light and decatising.

If instead of the 100 g of acid-modified polyester fabric, 200 g of a mixed fabric made from 50 parts of acid-modified polyester and 50 parts of non-acid-modified polyester are used, then with otherwise the same procedure, the non-acid-modified polyester part is recovered whilst the acid-modified polyester part is dyed a vivid yellow color.

Similar good results are obtained when replacing the dye salt of Example 37 in the above Example 41 by the dye salt of Example 1, Example 4 or Example 38.

We claim:

1. A dye salt of the formula

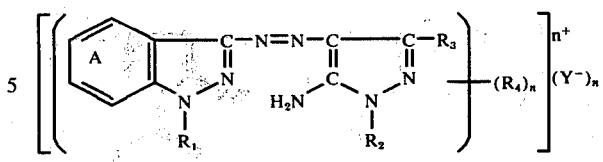

wherein $R_1$ represents methyl or ethyl, $R_2$ represents phenyl or phenyl substituted by chlorine or lower alkyl, $R_3$ represents methyl, $R_4$ represents methyl or ethyl and is bound to one of the two ring nitrogen atoms which are free from $R_1$ and $R_2$, Y represents an anion and $n$ represents 1 or 2 and the benzene ring A is unsubstituted or substituted by chlorine or nitro.

2. A composite dye consisting essentially of two dye salts as defined in claim 1, which are of the formulas

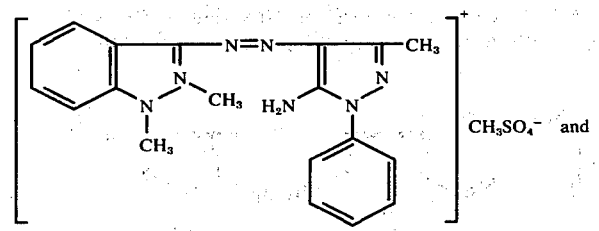

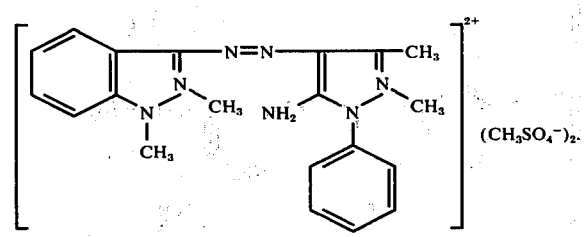

3. A composite dye consisting essentially of two dye salts as defined in claim 1, which are of the formulas

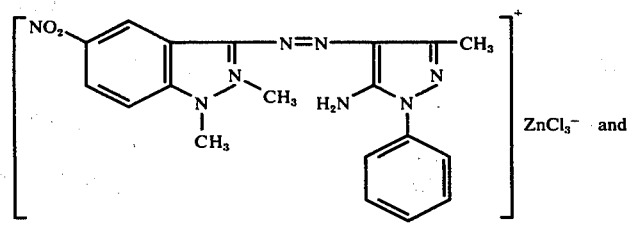

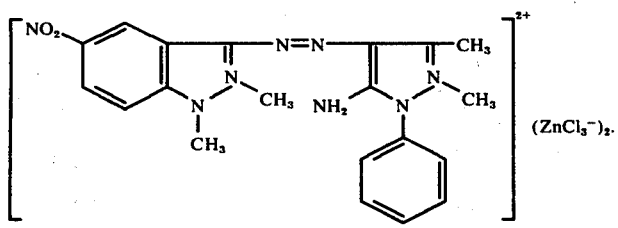

4. A composite dye consisting essentially of two dye salts as defined in claim 1, which are of the formulas

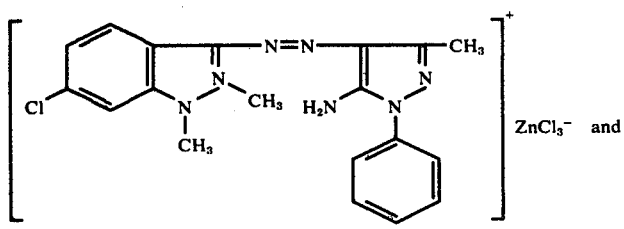

ZnCl$_3^-$ and

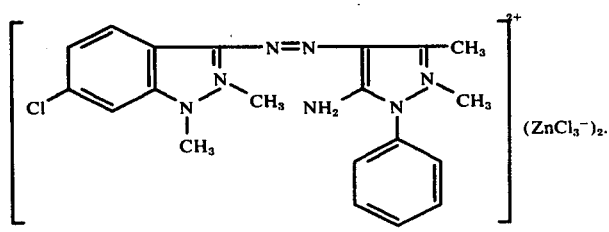

(ZnCl$_3^-$)$_2$.

5. A composite dye consisting essentially of two dye salts as defined in claim 1, which are of the formulas

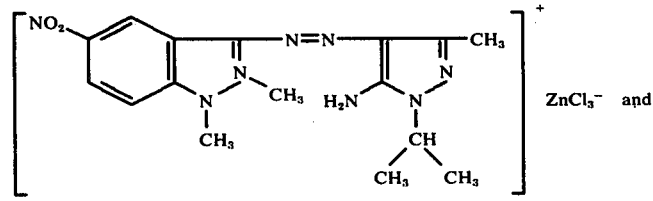

ZnCl$_3^-$ and

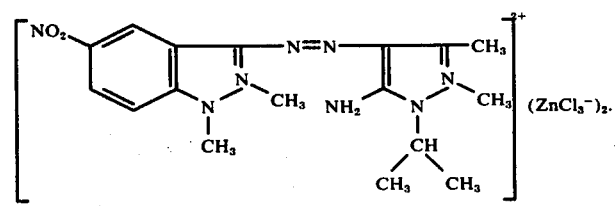

(ZnCl$_3^-$)$_2$.

6. A composite dye consisting essentially of two dye salts as defined in claim 1, which are of the formulas

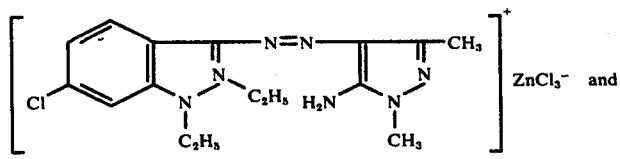

ZnCl$_3^-$ and

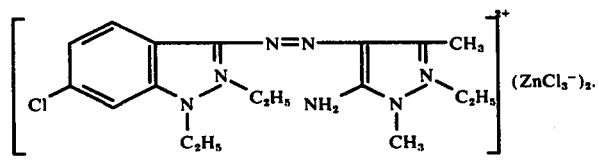

(ZnCl$_3^-$)$_2$.

7. A composite dye as defined in claim 1 consisting essentially of the dye salts of the formulas

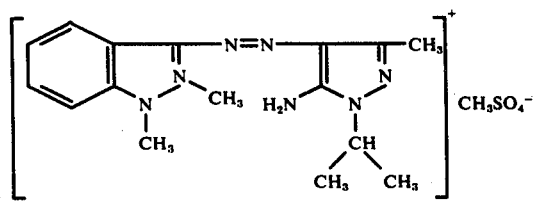

CH$_3$SO$_4^-$

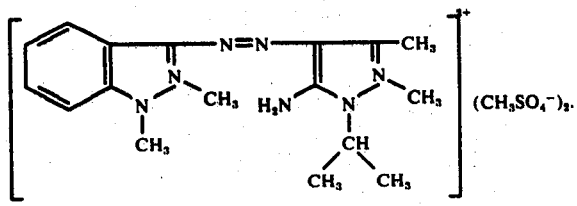

8. A dye salt as defined in claim 1, which is of the formula

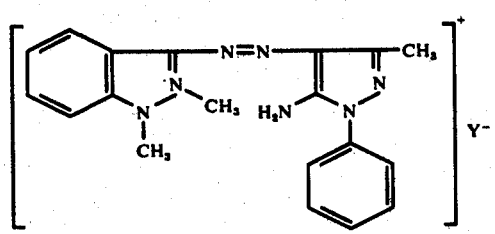

wherein Y⁻ represents Cl⁻ or ZnCl₃⁻.

9. A dye salt as defined in claim 1, which is of the formula

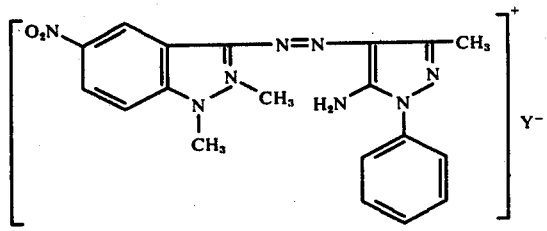

wherein Y⁻ represents Cl⁻ or ZnCl₃⁻.

10. A dye salt as defined in claim 1, which is of the formula

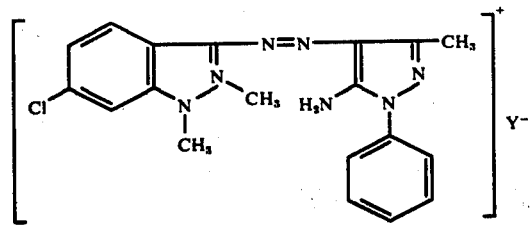

wherein Y⁻ represents Cl⁻ or ZnCl₃⁻.

11. A dye salt as defined in claim 1, which is of the formula

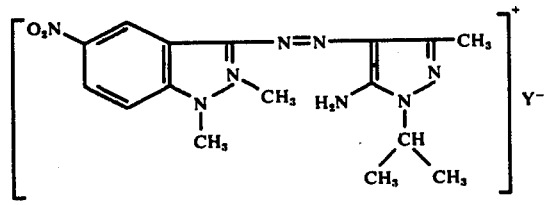

wherein Y⁻ represents Cl⁻ or ZnCl₃⁻.

12. A dye salt as defined in claim 1, which is of the formula

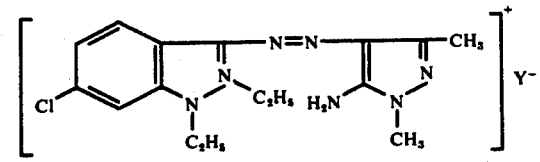

wherein Y⁻ represents Cl⁻ or ZnCl₃⁻.

13. A dye salt as defined in claim 1, which is of the formula

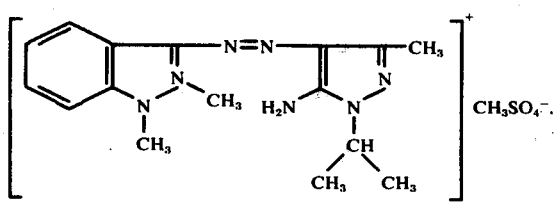
* * * * *